US012621765B2

(12) United States Patent
Du et al.

(10) Patent No.: US 12,621,765 B2
(45) Date of Patent: May 5, 2026

(54) DEVICE CONTROL METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Zhongda Du, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 309 days.

(21) Appl. No.: 18/226,706

(22) Filed: Jul. 26, 2023

(65) Prior Publication Data

US 2023/0379819 A1      Nov. 23, 2023

Related U.S. Application Data

(63) Continuation of application No. PCT/CN2021/074258, filed on Jan. 28, 2021.

(51) Int. Cl.
| | |
|---|---|
| *H04W 52/02* | (2009.01) |
| *H04W 76/28* | (2018.01) |
| *H04W 84/06* | (2009.01) |
| *H04W 88/06* | (2009.01) |

(52) U.S. Cl.
CPC ... *H04W 52/0216* (2013.01); *H04W 52/0241* (2013.01); *H04W 76/28* (2018.02); *H04W 84/06* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 2018/0098287 | A1 | 4/2018 | Ang | |
| 2018/0332533 | A1 | 11/2018 | Bhattad | |
| 2019/0364492 | A1* | 11/2019 | Azizi | H04W 52/0264 |
| 2020/0267646 | A1 | 8/2020 | Nam | |
| 2021/0058864 | A1* | 2/2021 | Martin | H04W 52/0216 |
| 2021/0274438 | A1* | 9/2021 | Guan | H04L 5/0023 |
| 2023/0269601 | A1* | 8/2023 | Laselva | H04B 7/06952 |
| | | | | 370/329 |

FOREIGN PATENT DOCUMENTS

| | | |
|---|---|---|
| CN | 110740498 A | 1/2020 |
| CN | 110896558 A | 3/2020 |

(Continued)

OTHER PUBLICATIONS

International Search Report in the international application No. PCT/CN2021/074258, mailed on Oct. 14, 2021. 5 pages with English translation.

(Continued)

*Primary Examiner* — Walter J Divito
(74) *Attorney, Agent, or Firm* — BAYES PLLC

(57) ABSTRACT

A device control method includes that: a terminal device enters a deep sleep mode in response to at least one of the following: determining that no data transmission is detected within a first duration; or receiving a mode switching instruction sent by a network device. A device control method at a network device side, a terminal device, and a network device are also provided.

20 Claims, 7 Drawing Sheets

(56) References Cited

FOREIGN PATENT DOCUMENTS

| CN | 111314272 | A | 6/2020 |
| CN | 111836408 | A | 10/2020 |

OTHER PUBLICATIONS

Written Opinion of the International Search Authority in the international application No. PCT/CN2021/074258, mailed on Oct. 14, 2021. 8 pages with English translation.

3GPP TR 38.821 V16.0.0 (Dec. 2019), 3rd Generation Partnership Project; Technical Specification Group Radio Access Network; Solutions for NR to support non-terrestrial networks (NTN) (Release 16). 140 pages.

Partial Supplementary European Search Report in the European application No. 21921826.0, mailed on Mar. 14, 2024, 14 pages.

Supplementary European Search Report in the European application No. 21921826.0, mailed on Jun. 5, 2024, 13 pages.

* cited by examiner

DEVICE CONTROL METHOD, TERMINAL DEVICE, AND NETWORK DEVICE

CROSS-REFERENCE TO RELATED APPLICATION

This application is a continuation of International Application No. PCT/CN2021/074258, entitled "DEVICE CONTROL METHOD, DEVICE, AND STORAGE MEDIUM", filed on Jan. 28, 2021, the disclosure of which is hereby incorporated by reference in its entirety.

TECHNICAL FIELD

The disclosure relates to terminal energy-saving technologies, and in particular to methods for device control, a terminal device, and a network device.

BACKGROUND

A Non-Terrestrial Network (NTN) provides communication services to a terrestrial user in a communication satellite-based communication mode. Compared with a terrestrial cellular network communication, the communication satellite-based communication has many unique advantages, for example, no user geographical restrictions, a long communication distance, and a high stability. However, in the terrestrial cellular network communication, the signal transmission time between a terminal and a base station is shorter, and a propagation delay is lower; while, in the NTN, the signal transmission time between a terminal and a communication satellite is longer, and the propagation delay increase greatly. Therefore, an energy-saving solution of the terrestrial cellular network communication is not applicable to the NTN.

SUMMARY

Embodiments of the disclosure provide a device control method, a device and a storage medium, which can effectively reduce the power consumption of a terminal in an NTN.

In a first aspect, the embodiments of the disclosure provide a device control method, which includes the following operation.

A terminal device enters a deep sleep mode in response to at least one of the following: determining that no data transmission is detected within a first duration; or receiving a mode switching indication sent by a network device.

In a second aspect, the embodiments of the disclosure provide a device control method, which includes at least one of the following:

a network device configures a first duration for a terminal device, where when a duration within which no data transmission is detected by the terminal device reaches the first duration, the terminal device enters a deep sleep mode; or the network device sends a mode switching indication to the terminal device, where the mode switching indication instructs the terminal device to enter the deep sleep mode.

In a third aspect, the embodiments of the disclosure provide a terminal device, which includes a mode switching module.

The mode switching module is configured to control the terminal device to enter a deep sleep mode in response to at least one of the following:

determining that no data transmission is detected within a first duration; or receiving a mode switching indication sent by a network device.

In a fourth aspect, the embodiments of the disclosure provide a network device, which includes at least one of a configuration module or a sending module.

The configuration module is arranged to configure a first duration for a terminal device, wherein when a duration within which no data transmission is detected by the terminal device reaches the first duration, the terminal device enters a deep sleep mode.

The sending module is configured to send a mode switching indication to the terminal device, where the mode switching indication instructs the terminal device to enter the deep sleep mode.

In a fifth aspect, the embodiments of the disclosure provide a terminal device, which includes a processor and a memory configured to store a computer program executable by the processor; where the processor is configured to perform a device control method executed by the above terminal device when running the computer program.

In a sixth aspect, the embodiments of the disclosure provide a network device, which includes a processor and a memory configured to store a computer program executable by the processor; where the processor is configured to perform a device control method executed by the above network device when running the computer program.

In a seventh aspect, the embodiments of the disclosure provide a storage medium having stored therein an executable program which, when executed by a processor, causes the processor to perform a device control method executed by the terminal device.

In an eighth aspect, the embodiments of the disclosure provide a storage medium having stored therein an executable program which, when executed by a processor, causes the processor to perform a device control method executed by the above network device.

The device control method provided by the embodiments of the disclosure includes: the terminal device enters a deep sleep mode in response to at least one of the following: determining that no data transmission is detected within a first duration; or receiving the mode switching indication sent by the network device. The terminal device can enter the deep sleep mode according to an own data transmission requirement or an indication from the network device, thereby reducing the energy consumption of the terminal device.

DETAILED DESCRIPTION

In order to provide a more detailed understanding of the features and technical contents of the embodiments of the disclosure, the implementation of the embodiments of the disclosure will be described in detail below with reference to the accompanying drawings, and the accompanying drawings are for illustrative purposes only and are not intended to limit the embodiments of the disclosure.

Before a random access method provided by the embodiments of the disclosure is described in detail, an NTN is briefly described first.

In a New Radio (NR), requirements on terrestrial cellular communications are mainly considered. In the cellular communication, a cell radius is generally in a range from hundreds of meters to several kilometers, and a path propagation delay of an uplink and a downlink is short and ranges from several microseconds (us) to tens of microseconds. Therefore, the path propagation delay has less influence on the setting of various transmission timings.

Figure 1:
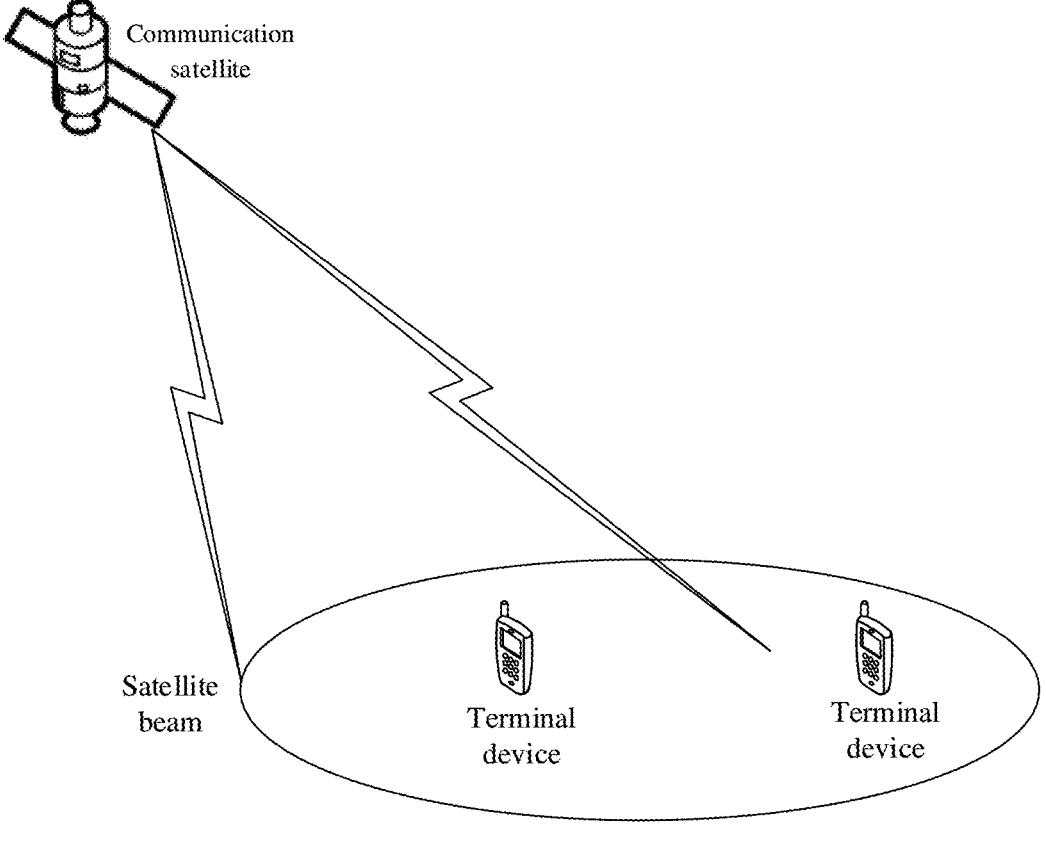
FIG. 1 is a schematic diagram of a communication link of an NTN according to an embodiment of the disclosure.

Compared with a cellular network adopted by the NR, a signal propagation delay between User Equipment (UE) and a communication satellite in the NTN increases greatly. A link of the NTN is illustrated in FIG. 1, the communication satellite delivers/transmits a satellite beam (i.e., a beam generated by an antenna on-board a satellite) for information interaction with a terminal device within a coverage area of the satellite beam. In addition, as the communication satellite has a wide coverage range, both a downlink (a link from the communication satellite to the terminal device) and an uplink (a link from the terminal device to the communication satellite) are long in the path propagation delay. In a communication system, a signal transmission delay of a terminal is from hundreds of milliseconds to tens of milliseconds. In an example, a maximum signal transmission delay of the terminal device covered by various types of communication satellites is shown in Table 1. The maximum signal transmission delay in Table 1 is a two-way latency between the terminal and a base station, that is, a round-trip transmission delay.

TABLE 1

| Single maximum signal transmission delay of a terminal device | | |
|---|---|---|
| Types of a satellite | Functions of the satellite | Maximum signal transmission delay (milliseconds) |
| Geostationary Earth Orbit (GEO) satellite | Transparent transmission | 541.46 |
| Geostationary Earth Orbit (GEO) satellite | Decoding and forwarding | 270.73 |
| Low-Earth Orbit (LEO) satellite, 600 kilometers | Transparent transmission | 25.77 |
| Low-Earth Orbit (LEO) satellite, 1200 kilometers | Transparent transmission | 41.77 |
| Low-Earth Orbit (LEO) satellite, 600 kilometers | Decoding and forwarding | 12.89 |
| Low-Earth Orbit (LEO) satellite, 1200 kilometers | Decoding and forwarding | 20.89 |

It can be seen from the above Table 1 that, for a Low-Earth Orbit (LEO) communication satellite, that is, an LEO satellite, the signal transmission delay of the terminal device is tens of milliseconds; while, for a Geostationary Earth Orbit (GEO) communication satellite, that is, a GEO satellite, the signal transmission delay of the terminal device is hundreds of milliseconds.

If a processing delay of a communication protocol stack and the transmission delay of a terrestrial network are also considered, an end-to-end delay of a data packet may be a few seconds. If it is a two-way interactive service, such as a voice service, a similar delay is also required in a reply of the other side. That is, after sending a piece of data, the terminal will not receive and send data for a period of time before the reply of the other side is received, thus a session with a relatively large duty cycle is formed.

Figure 2:
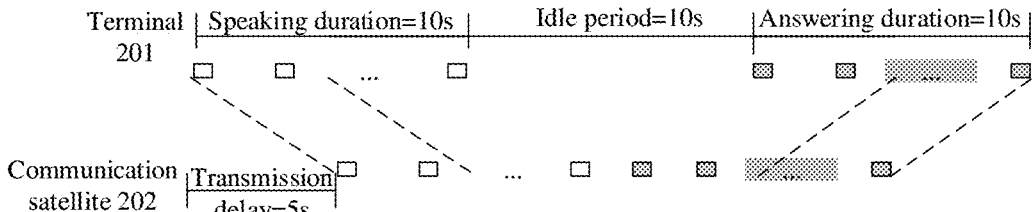
FIG. 2 is a schematic diagram of a time domain effect of sending a data packet in an NTN system according to an embodiment of the disclosure.

As illustrated in FIG. 2, a terminal 201 sends data to a terminal 203 (it is not illustrated) through a communication satellite 202. A duration of a user voice received by the terminal 201 is 10 seconds, a transmission delay is 5 seconds, an idle period is 10 seconds, the duration of the voice received by the terminal 201 is 10 seconds, thus, for the terminal 201, the duty ratio of the service is: idle period/(a speaking duration plus the idle period plus_an answering duration)=10/(10+10+10)=1/3.

Such characteristic may be adopted by a communication network. In the idle period when data are not transceived, the terminal enters a power saving mode so as to reduce the consumption of a battery.

It is to be noted that after receiving a data packet, a terminal device does not need to enter the power saving mode because a user is thinking or does not speak due to other reasons in the period when no data are transmitted.

In a 3rd Generation Partnership Project (3GPP) system, a network device may configure a Discontinuous Reception (DRX) mechanism for the terminal device, so that the terminal monitors a Physical Downlink Control Channel (PDCCH) discontinuously to achieve a purpose of power saving of the terminal device.

Figure 3:
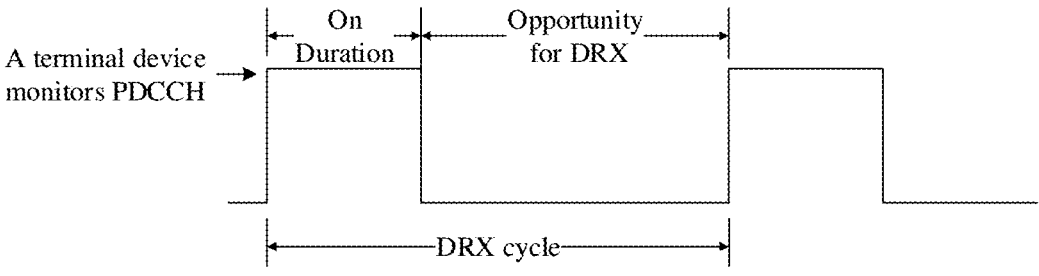
FIG. 3 is a schematic diagram of an optional Discontinuous Reception (DRX) cycle for discontinuous reception according to an embodiment of the disclosure.

A basis mechanism of the DRX is to configure a DRX cycle for the terminal device. As illustrated in FIG. 3, a DRX cycle is composed of an activation period (On Duration) and a dormancy period (Opportunity for DRX). Within the On Duration, a terminal device monitors and receives the PDCCH; if data scheduling is received in the On Duration, the terminal device continuously detects the PDCCH under the control of a DRX timer until data transmission is completed; otherwise, if no data scheduling is received in the On Duration of the DRX, a terminal enters the Opportunity for DRX, and the terminal does not receive data of a downlink channel in the Opportunity for DRX so as to reduce power consumption.

As illustrated in FIG. 3, time is divided into successive DRX cycles in a time domain.

A balance between a battery and a delay should be considered for selection of the DRX cycle. In one aspect, the long DRX cycle is beneficial to prolonging usage time of the battery (i.e., the battery life) of the terminal device. Taking web-page browsing as an example, when a user reads a downloaded web-page, resources are wasted if the terminal device receives down-link data continuously at this time. In another aspect, when new data transmission is available, a shorter DRX cycle is beneficial to faster response. In order to satisfy the above requirement, two DRX cycles may be configured for the terminal device: a long DRX cycle and a short DRX cycle.

Taking the voice service as an example, in general, in a data transmission process of a communication system, an interval between two data packets in the terminal device is 20 milliseconds, that is, one data packet is received every 20 milliseconds, when a voice data packet is sent or received, the adopted short DRX cycle may be 20 milliseconds (ms). In an idle period, the adopted long DRX cycle may be several hundreds of milliseconds; the idle period herein refers to an interval for generation of voice data packets by the system when voice communication is paused, and a cycle of the idle period may be several hundreds of milliseconds. If FIG. 2 is taken as an example, the long DRX CYCLE may be about 10 seconds. The DRX CYCLE for data transmission by the terminal may be controlled by the timer. The DRX CYCLE for data reception by the terminal may be controlled by a Media Access Control (MAC) Control Element (CE).

In addition, a network device further configures an inactivity timer duration for the terminal. The terminal starts the inactivity timer when a new data packet is scheduled each time. When the inactivity timer expires, User Equipment (UE) does not detect a Physical Downlink Control Channel (PDCCH) any more, except within "activation period (On Duration)".

The 3GPP system also allows the terminal device to be temporarily switched from an active Bandwidth Part (BWP) to an inactive BWP or to reduce a bandwidth of the BWP so as to save energy.

However, the DRX mechanism has at least the following problems.

1. A maximum value of the long DRX cycle is several hundreds of milliseconds, and the duration of the idle period may exceed this maximum value. If a plurality of DRX cycles are adopted to supplement the idle period, which also means that the terminal device needs to wake up in a middle time point.

2. The DRX cycle increases exponentially by 2 beginning from 64 milliseconds, that is, the longer the cycle, the larger the interval, the coarser the granularity.

3. The active and inactive time of the DRX cycle is constant in a time-line, which may not be matched with a practical idle period, due to the fact that the idle period appears flexibly.

4. According to a definition of a 3GPP standard specification, when the terminal device is in the inactive period of the DRX, the terminal device may perform other activities, such as Radio Resource Management (RRM) measurement, that is, the terminal device also needs to consume a certain amount of energy in the inactive period.

5. If the terminal device is intended to be switched to the inactive BWP, the terminal device must be configured with carrier aggregation first, however, for the satellite communication, the terminal device may not necessarily be configured with carrier aggregation.

Therefore, the DRX mechanism is not applicable to the NTN system.

Based on the above problems, the embodiments of the disclosure provide a device control method, which is applied to a Non-Terrestrial Network (NTN) system.

Figure 4:
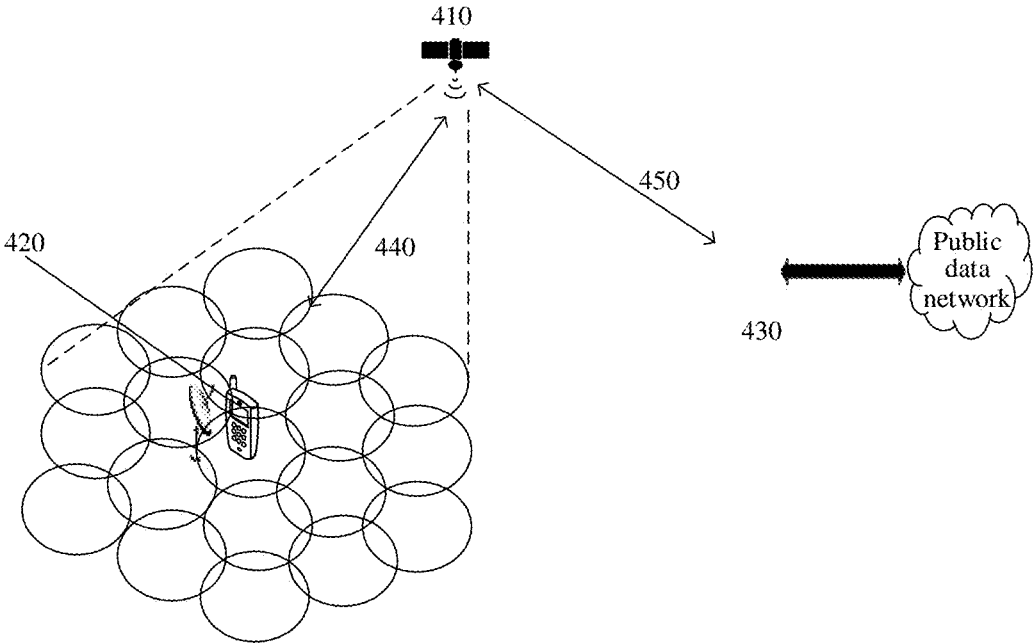
FIG. 4 is a schematic diagram of an optional composition structure of a communication system according to an embodiment of the disclosure.

Exemplarily, the NTN system 400 to which the embodiments of the disclosure are applied is illustrated in FIG. 4. The communication system 400 includes a network device 410, and the network device 410 may be a device that communicates with a terminal device 420 (or called as a communication terminal or a terminal). The network device 410 can provide communication coverage for a specific geographical area, and can communicate with a terminal device located within the coverage area to provide services for the terminal device within the coverage area.

Optionally, the network device 410 is a communication satellite or an Unmanned Aircraft System (UAS) platform. Communication satellites are classified into LEO satellites, Medium-Earth Orbit (MEO) satellites, GEO satellites, High Elliptical Orbit (HEO) satellites, etc. according to different orbital altitudes. The altitude range of the LEO satellite is 500 km to 1500 km, and the corresponding orbital period is about 1.5 hours to 2 hours. A signal propagation delay of single-hop communication between users is generally less than 20 ms. The maximum satellite visible time is 20 minutes. A signal propagation distance is short, a link loss is low, and the requirement on the transmission power of a user terminal is not high. The GEO has the orbital attitude of 35786 km and a rotation period of 24 hours around the earth. The signal propagation delay of the single-hop communication between the users is generally is 250 ms.

In order to ensure the coverage of a communication satellite and improve the system capacity of the whole satellite communication system, the communication satellite covers the ground by using a plurality of beams. One satellite can form tens or even hundreds of beams to cover the ground. The beams of one communication satellite can cover a ground area with a diameter of tens to hundreds of kilometers.

The communication system 400 further includes at least one terminal device 420 within the coverage of the network device 410. A "terminal device" used herein includes, but is not limited to, a device arranged to receive/send a communication signal for a communication satellite network, and/ or an Internet of Things (IoT) device. The terminal device arranged to communicate through a wireless interface may be called as a "wireless communication terminal", a "wireless terminal" or a "mobile terminal". Examples of a mobile terminal include, but are not limited to: a communication satellite telephone; a Personal Communication System (PCS) terminal capable of combining a communication satellite telephone and data processing, faxing and data communication capabilities; a Personal Digital Assistant (PDA) capable of including a radio telephone, a pager, Internet/intranet access, a Web browser, a notepad, a calendar and/or a Global Positioning System (GPS) receiver; and a conventional laptop and/or palmtop receiver or another electronic device including a radio telephone transceiver. The terminal device may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle device, a wearable device, a terminal device in the 5G network, a terminal device in the future evolved PLMN or the like.

The network device 410 communicates with the terminal device 420 through a service link or a radio link 440. The network device 410 may communicate with a gateway 430 based on a feeder link or a radio link 450 and is connected to a public data network through the gateway 430.

Figure 5:
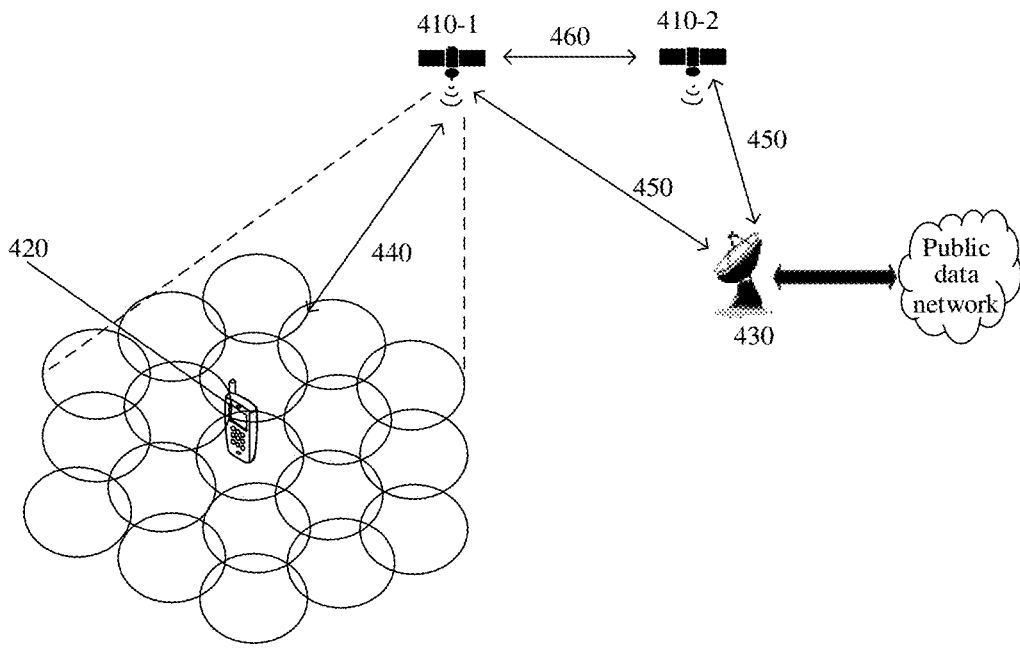
FIG. 5 is a schematic diagram of an optional composition structure of a communication system according to an embodiment of the disclosure.

In an example, as illustrated in FIG. 5, a network device 410 in a communication system 400 includes a network device 410-1 and a network device 410-2. The network device 410-1 and the network device 410-2 communicate with each other through Inter-Satellite Links (ISL) 460, and the network device 410-1 is configured to implement a transparent payload: Radio Frequency filtering, Frequency conversion and amplification. Hence, a signal is un-changed through transparent transmission of the network device 410-1 (i.e., the waveform signal repeated by the payload is un-changed). The network device 410-2 is configured to implement a regenerative payload: Radio Frequency filtering, Frequency conversion and amplification, as well as demodulation and decoding, switching and/or routing, encoding and modulation.

It is to be understood that a device with a communication function in the network/system in the embodiments of the disclosure may be called as a communication device. Taking the communication system 400 illustrated in FIG. 4 or FIG. 5 as an example, communication devices may include the network device 410 and the terminal device 420 with communication functions, and the network device 410 and the terminal device 420 may be the specific devices mentioned above and will not be elaborated herein. The communication devices may further include other devices in the communication system 400, for example, other network entities like an Unmanned Aircraft System (UAS). There are no limits made thereto in the embodiments of the disclosure.

A device control method provided by the embodiments of the disclosure includes the following operation.

A terminal device enters a deep sleep mode in response to at least one of the following: determining that no data transmission is detected within a first duration, or receiving a mode switching indication sent by a network device.

Optionally, when no data transmission is detected within the first duration, the terminal device enters the deep sleep mode.

Optionally, when the mode switching indication sent by the network device is received, the terminal device enters the deep sleep mode.

Optionally, when the mode switching indication sent by the network device is received and when no data transmission is detected within the first duration after the mode switching indication is received, the terminal device enters the deep sleep mode.

A device control method provided by the embodiments of the disclosure may include the following operations.

A network device configures a first duration for a terminal device. When a duration within which no data transmission is detected by the terminal device reaches the first duration, the terminal device enters a deep sleep mode; and/or the network device sends a mode switching indication to the terminal device, where the mode switching indication instructs the terminal device to enter the deep sleep mode.

Optionally, the network device configures the first duration for the terminal device, such that the terminal device enters the deep sleep mode when no data transmission is detected within the first duration.

Optionally, the network device configures the mode switching indication for the terminal device, such that the terminal device enters the deep sleep mode when receiving the mode switching indication.

Optionally, the network device configures the mode switching indication and the first duration for the terminal device, such that the terminal device enters the deep sleep mode when the terminal device receives the mode switching indication and when no data transmission is detected within the first duration.

In the embodiments of the disclosure, resources used by the terminal device for data transmission are scheduled by the network device.

In some embodiments, the terminal device in the deep sleep mode does not transmit and receive wireless signals.

The operation that the terminal device enters the deep sleep mode in response to determining that no data transmission is detected within the first duration is taken as an example, the terminal device detects data transmission within the first duration T, if the data transmission is detected, the data transmission is continuously detected until a duration within which no data transmission is detected reaches the first duration T, the terminal device enters the deep sleep mode at the end of the first duration.

Figure 6:
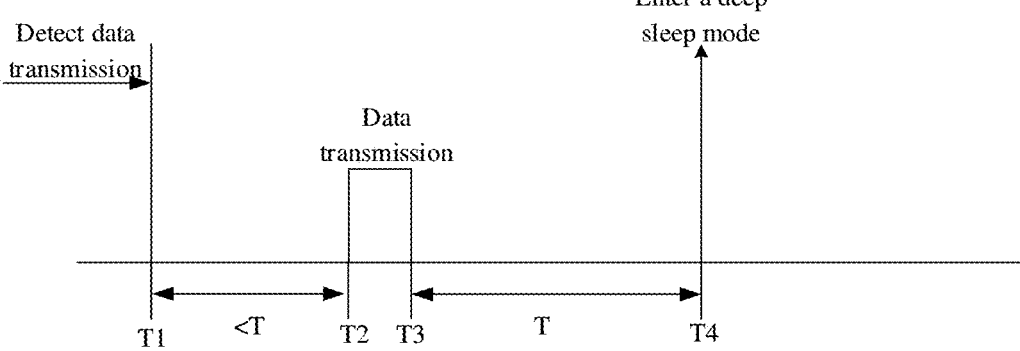
FIG. 6 is a schematic diagram of an effect of an optional device control method according to an embodiment of the disclosure.

In an example, as illustrated in FIG. 6, a terminal device begins to detect data transmission at time T1, when the data transmission is detected at time T2 which has a time interval less than the first duration T with T1, the data transmission is continuously detected; when no data transmission is detected at time T3 and before time T4 which has the time interval T with T3, the terminal device enters a deep sleep mode at time T4.

In some embodiments, a configuration manner of the first duration includes at least one of the following:

The first duration is configured by a network device through Radio Resource Control (RRC) signaling;

The first duration is configured by the network device through MAC CE; or

The first duration is configured by the network device through physical layer signaling.

Optionally, when the first duration is configured by the network device through physical layer signaling, the first duration may be specifically configured by the network device through a PDCCH.

Figure 7:
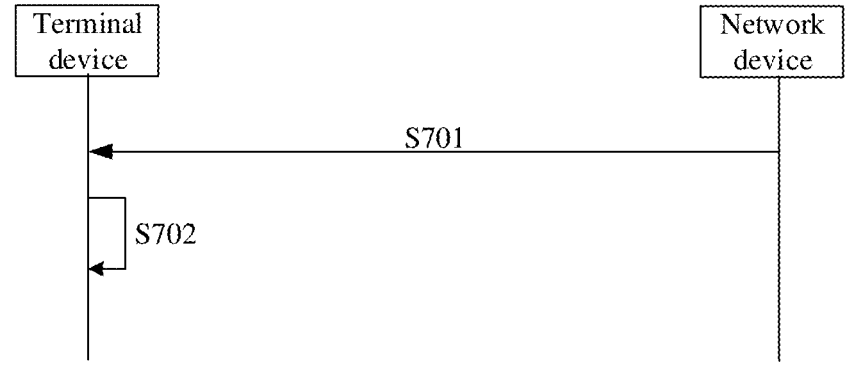
FIG. 7 is a schematic diagram of an effect of an optional device control method according to an embodiment of the disclosure.

Optionally, as illustrated in FIG. 7, the device control method includes the following operations.

At S701, a network device configures a first duration for a terminal device.

At S702, the terminal device enters a deep sleep mode in response to determining that no data transmission is detected within the first duration.

In S701, the network device may configure the first duration for the terminal device through at least one of the following: RRC signaling, MAC CE, or physical layer signaling.

Optionally, the length of the first duration is configured by the network device.

In some embodiments, the operation that the terminal device enters the deep sleep mode in response to determining that no data transmission is detected within the first duration includes: the terminal device detects the data transmission in the running period of a first timer; when the first timer expires, the terminal device enters the deep sleep mode. The period of the first timer is the first duration.

The first timer is arranged in the terminal device, and a duration of the first timer is the first duration. When detecting data transmission, a terminal starts the first timer, and detects the data transmission during the running period of the first timer; when the data transmission is detected, the first timer is restarted. If no data transmission is detected during the running period of the first timer, the terminal device enters the deep sleep mode when the first timer expires.

In some embodiments, a timing of starting or restarting the first timer includes at least one of the following:

Timing I, a moment at which data transmission is completed in a case where the terminal device is scheduled by the network device to perform the data transmission; or Timing II, a moment at which the terminal device completes data transmission through pre-configured wireless resources.

In the timing I, in a case where the terminal device is scheduled by the network device to send the data, when the terminal device completes the data sending, the first timer is started or restarted.

In the timing II, in a case where the terminal device sends the data through the pre-configured wireless resources, when the terminal device completes the data sending, the first timer is started or restarted.

In the embodiments of the disclosure, the terminal device detects data transmission during the running period of the first timer; in a case where the terminal device is scheduled by the network device to send the data or sends the data through the pre-configured wireless resources, when the data sending is completed, the first timer is started or restarted; the data transmission is continuously detected until no data transmission is detected when the first timer expires, the terminal device enters the deep sleep mode.

In some embodiments, the pre-configured wireless resources include Physical Uplink Shared Channel (PUSCH) channel resources.

The operation that the terminal device enters the deep sleep mode in response to receiving the mode switching indication sent by the network device is taken as an example. The terminal device receives the mode switching indication sent by the network device, where the mode switching indication instructs the terminal device to enter the deep sleep mode; and the terminal device enters the deep sleep mode based on the received mode switching indication.

In some embodiments, when the network device sends the mode switching indication to the terminal device, the network device determines whether to send the mode switching indication to a terminal, according to at least one of a Buffer Status Report (BSR) or a service characteristic.

The BSR may indicate the amount of data that needs to be sent by the terminal device. Optionally, when the BSR indicates that a cache of the terminal device is empty, the network device determines, based on the BSR reported by the terminal, that the terminal device does not perform data transmission any more within a period of time, and sends the mode switching indication to the terminal device to instruct the terminal device to enter the deep sleep mode.

The service characteristic may indicate a distribution regularity of sizes of data packets to be transmitted by the terminal device and a manner in which the data packets are distributed in a time domain. When the network device determines, based on the service characteristic, that the terminal device does not perform data transmission any more within a period of time, the network device sends the mode switching indication to the terminal device to instruct the terminal device to enter the deep sleep mode.

Optionally, the mode switching indication can be sent through at least one of the following: RRC signaling, MAC CE, or physical layer signaling. In the embodiments of the disclosure, the sending manner of the mode switching indication is not limited.

Optionally, after sending the mode switching indication, if the network device determines that the terminal device is about to enter the deep sleep mode, the network device may perform a power-saving operation related to the terminal device.

In some embodiments, before the terminal device receives the mode switching indication sent by the network device, the terminal device sends a mode switching notification to the network device, where the mode switching notification indicates that the terminal device is capable of entering the deep sleep mode.

Optionally, when the terminal device determines that no data transmission is to be performed within a period of time, the terminal device sends the mode switching notification to the network device to notify the network device that the terminal device is capable of entering the deep sleep mode.

Optionally, information used by the terminal device for determining whether to perform data transmission within a period of time includes: application layer information.

Optionally, the network device receives the mode switching notification sent by the terminal device.

The network device determines, based on the mode switching notification, that the terminal device is capable of entering the deep sleep mode.

Optionally, after receiving the mode switching notification, the network device sends the mode switching indication to the terminal device to instruct the terminal device to enter the deep sleep mode.

Optionally, after receiving the mode switching notification, the network device does not send the mode switching indication to the terminal device.

In the embodiments of the disclosure, the terminal device gives a suggestion of entering the deep sleep mode to the network device through the mode switching notification; after adopting the suggestion of the terminal device, the network device sends the mode switching indication to the terminal device.

In some embodiments, the mode switching indication indicates a manner in which the terminal device enters the deep sleep mode in the time domain.

Figure 8:
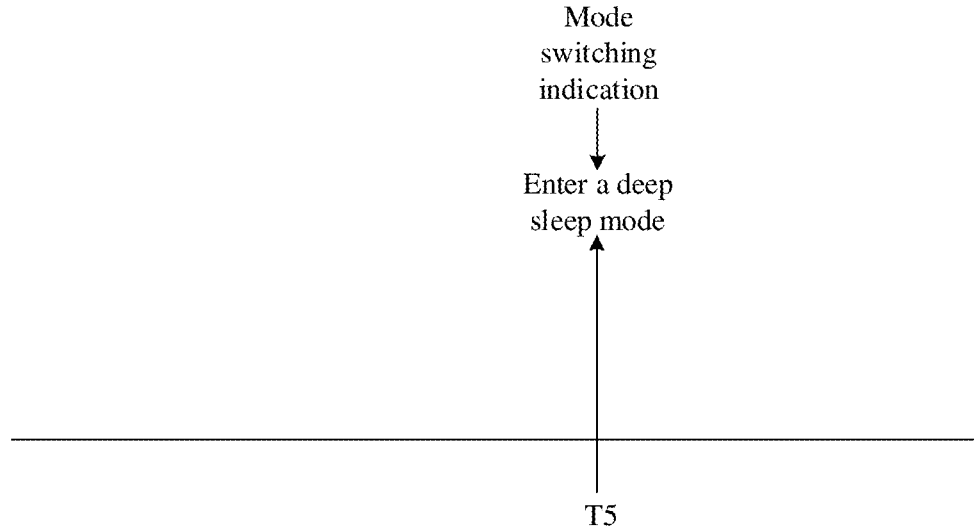
FIG. 8 is a schematic diagram of an effect of an optional device control method according to an embodiment of the disclosure.

Taking the mode switching indication instructing the terminal device to enter the deep sleep mode immediately after receiving the mode switching indication as an example. After receiving the mode switching indication sent by the network device, the terminal device enters the deep sleep mode immediately. In an example, as illustrated in FIG. 8, the terminal device enters a deep sleep mode at time T5 immediately after receiving a mode switching indication from the network device at time T5.

Figure 9:
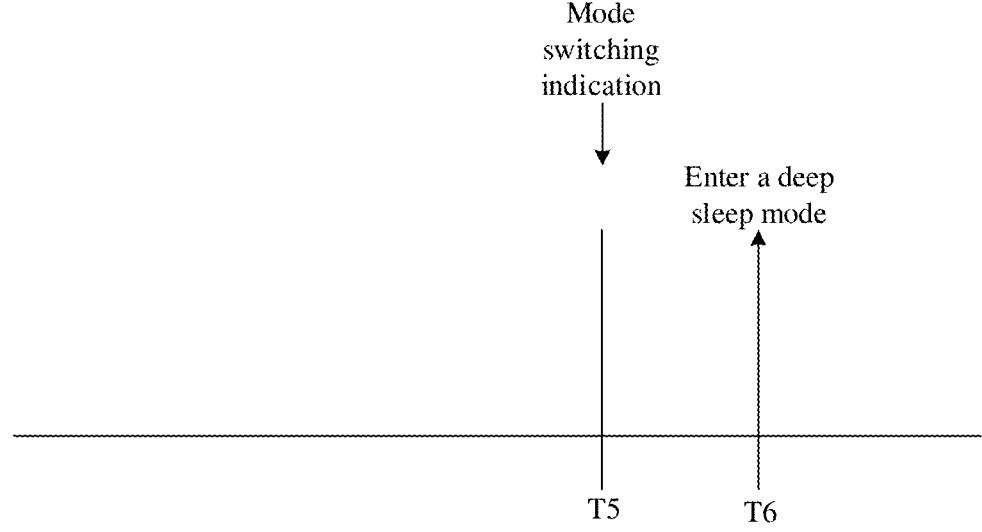
FIG. 9 is a schematic diagram of an effect of an optional device control method according to an embodiment of the disclosure.

Taking the mode switching indication instructing the terminal device to enter the deep sleep mode after a period of time after receiving the mode switching indication as an example. After receiving the mode switching indication sent by the network device, the terminal device enters the deep sleep mode after a period of time indicated by the mode switching indication. In an example, as illustrated in FIG. 9, after receiving a mode switching indication from a network device at time T5, a terminal device enters a deep sleep mode at time T6; and a time interval between time T5 and time T6 is a period of time t indicated by the mode switching indication.

In some embodiments, the network device performs a power-saving operation associated with the terminal device.

Optionally, a timing for the network device to perform the power-saving operation associated with the terminal device includes at least one of the following:

power-saving timing I, a moment at which transmission of the mode switching indication is completed;

power-saving timing II, a moment at which reception of a mode switching notification is completed; or power-saving timing III, a moment, determined based on a first duration, at which the terminal device enters the deep sleep state.

In the power-saving timing I, after sending the mode switching indication to the terminal device, if the network device determines that the terminal device is about to enter the deep sleep mode, the network device performs the power-saving operation associated with the terminal device.

In the power-saving timing II, after receiving the mode switching notification sent by the terminal device, if the network device determines that the terminal device is about to enter the deep sleep mode, the network device performs the power-saving operation associated with the terminal device.

In the power-saving timing III, the network device determines, based on scheduled resources for the terminal device to perform data transmission, that the terminal device does not perform data transmission within the first duration, determines, based on the first duration, the moment at which the terminal device enters the deep sleep mode, and performs the power-saving operation associated with the terminal device at the moment when the terminal device enters the deep sleep mode.

In the embodiments of the disclosure, the resources for terminal device to perform data transmission are scheduled by the network device, and the first duration is configured by the network device, therefore, the network device may know the moment at which the terminal enters deep sleep, and synchronously performs the power-saving operation, thereby reducing the power consumption of the communication system to the greatest extent.

In some embodiments, the power-saving operation associated with the terminal device includes: stopping sending a reference signal related to the terminal device.

Optionally, the reference signal includes a Channel State Information (CSI) reference signal.

In some embodiments, after the terminal device enters the deep sleep mode for a second duration, the terminal device is switched from the deep sleep mode to an active mode; the terminal device may receive and/or send a wireless signal in the active mode.

The second duration is a duration within which the terminal device is in deep sleep, which may also be referred to as a duration in which data transmission and reception are paused.

Figure 10:
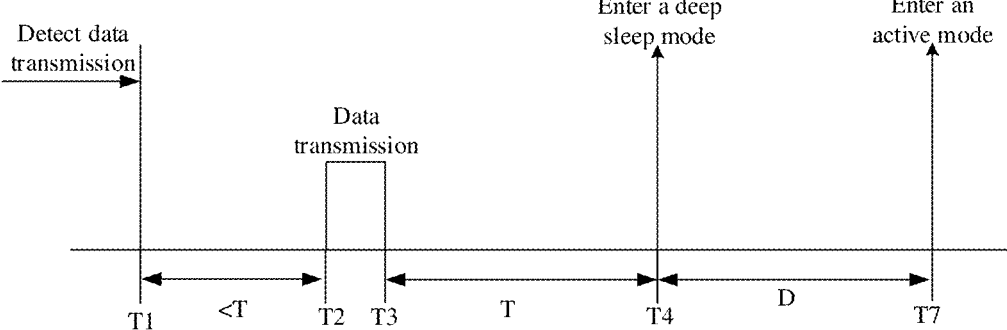
FIG. 10 is a schematic diagram of an effect of an optional device control method according to an embodiment of the disclosure.

Taking the terminal device entering a deep sleep mode at time T4 illustrated in FIG. 6 as an example. As illustrated in FIG. 10, the terminal device is switched from the deep sleep mode to an active mode at time T7, that is, the terminal device enters the active mode. A time interval between time T4 and time T7 is a second duration D.

Figure 11:
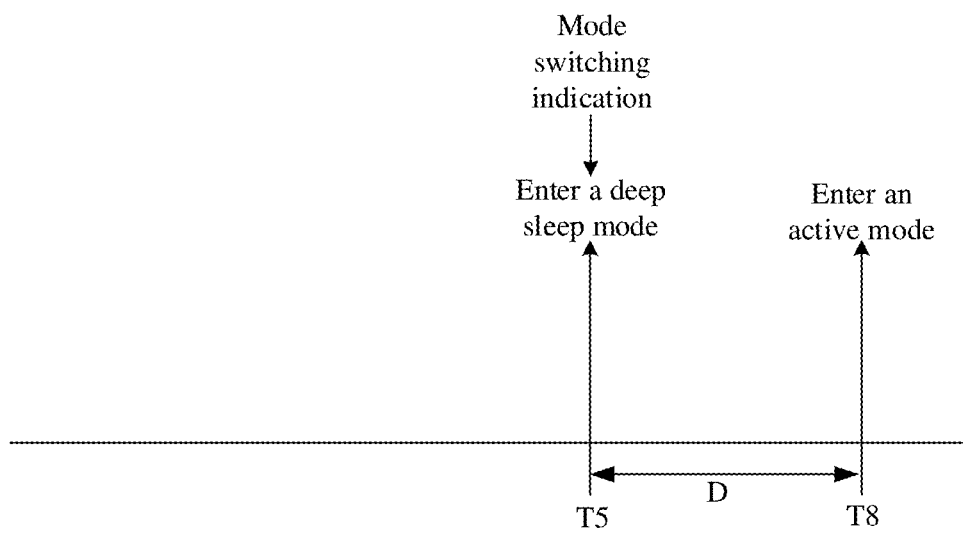
FIG. 11 is a schematic diagram of an effect of an optional device control method according to an embodiment of the disclosure.

Taking the terminal device entering a deep sleep mode at time T5 illustrated in FIG. 8 as an example. As illustrated in FIG. 11, the terminal device is switched from the deep sleep mode to an active mode at time T8, that is, the terminal device enters the active mode. A time interval between time T5 and time T8 is a second duration D.

Optionally, the second duration in a case where the terminal device enters the deep sleep mode when no data transmission is detected within the first duration is different from the second duration in a case where the terminal device enters the deep sleep mode when a mode switching indication sent by the network device is received.

In some embodiments, the network device configures the second duration for the terminal device; the second duration is a duration within which the terminal device is in the deep sleep mode.

In some embodiments, a configuration manner of the second duration includes at least one of the following:

The second duration is configured by the network device through RRC signaling.

The second duration is configured by the network device through MAC CE; or

The second duration is configured by the network device through physical layer signaling.

Optionally, the length of the second duration is configured by the network device.

Optionally, the first duration and the second duration may be separately configured through different pieces of signaling, or may be configured through the same signaling.

Optionally, when the first duration and the second duration are separately configured through different pieces of signaling, the type of the signaling for configuring the first duration and the type of the signaling for configuring the second duration may be the same or different.

In some embodiments, a condition for the terminal device to enter deep sleep includes: the terminal device operates with a mode switching mechanism.

In the embodiments of the disclosure, the terminal device enters the deep sleep mode only when the mode switching mechanism is running on the terminal device.

In some embodiments, an activation timing of the mode switching mechanism includes: a moment at which the terminal device receives mechanism activation indication information configured by the network device.

Herein, the network device configures the mechanism activation indication information for the terminal device, where the mechanism activation indication information instructs the terminal device to activate the mode switching mechanism.

After receiving the mechanism activation indication information configured by the network device, the terminal device activates the mode switching mechanism and may enter the deep sleep mode from a current state.

In some embodiments, in a case where the terminal device determines that no data transmission is detected within the first duration, the mechanism activation indication information configured by the network device includes at least one of the first duration or the second duration configured by the network device; and/or in a case where the terminal device receives the mode switching indication sent by the network device, the mechanism activation indication information configured by the network device includes the mode switching indication.

In some embodiments, in a case where the network device configures the first duration for the terminal device, the mechanism activation indication information includes at least one of the first duration or the second duration; and/or in a case where the network device sends the mode switching indication to the terminal device, the mechanism activation indication information includes the mode switching indication.

Taking the terminal device entering the deep sleep mode in response to determining that no data transmission is detected within the first duration as an example. When the terminal device receives the first duration and/or the second duration configured by the network device, the terminal device activates the mode switching mechanism; and when no data transmission is detected within the first duration, the terminal device enters the deep sleep mode. In this case, the activation of the mode switching mechanism and the entry the deep sleep mode are performed separately.

Taking the terminal device entering the deep sleep mode in response to receiving the mode switching indication sent by the network device as an example. After receiving the mode switching indication sent by the network device, the terminal device activates the mode switching mechanism and enters the deep sleep mode. In this case, the activation of the mode switching mechanism and the entry of the deep sleep are performed simultaneously.

The operation that the terminal device enters the deep sleep mode after receiving the mode switching indication sent by the network device and determining that no data transmission is detected within the first duration is taken as an example. In response to receiving any one or more of the first duration, the second duration or the mode switching indication configured by the network device, the terminal device activates the mode switching mechanism; and when no data transmission is detected within the first duration, the terminal device enters the deep sleep mode. In this case, activation of the mode switching mechanism and the entry of the deep sleep mode are performed separately.

In some embodiments, an activation condition of the mode switching mechanism includes at least one of the following:

Condition I, the terminal device is in a Radio Resource Control connected (RRC-CONNECTED) state; or Condition II, the terminal device supports the mode switching mechanism.

In some embodiments, the terminal device sends switching capability indication information to the network device, where the switching capability indication information indicates that the terminal device supports the mode switching mechanism.

Herein, the network device receives the switching capability indication information from the terminal device, where the switching capability indication information indicates that the terminal device supports the mode switching mechanism.

The network device determines, based on the switching capability indication information sent by the terminal device, that the terminal device supports the mode switching mechanism.

Optionally, when determining that the terminal device supports the mode switching mechanism, the network device configures at least of the first duration or the second duration for the terminal device, or sends the mode switching indication to the terminal device.

In some embodiments, a sending manner of the switching capability indication information for the terminal device includes: the switching capability indication information is sent through User Equipment CAPABILITY (UE CAPABILITY) signaling.

Correspondingly, a receiving manner of the switching capability indication information for the network device includes: the switching capability indication information is received through the UE CAPABILITY signaling.

When the terminal device sends the UE CAPABILITY signaling to the network device, the terminal device carries the switching capability indication information (indicating that the terminal device supports the mode switching mechanism) in the UE CAPABILITY signaling. The network device receives the switching capability indication information based on the UE CAPABILITY signaling.

In the following, the device control method provided by the embodiments of the disclosure is further described by taking a voice scene as an example.

In the embodiments of the disclosure, a deep sleep power-saving mode is defined first. In this mode, a terminal does not send and receive any wireless signal, and enters a deep sleep mode to achieve the purpose of saving power.

A cellular network in which communication signals are provided by a communication satellite is called as a satellite communication network. In such a communication network, a device in space is generally a base station or a certain basic part of the base station. In order to reduce the power consumption of the terminal as much as possible, a network device configures the following two parameters for the terminal:

Parameter I, a duration T of a service inactivity timer; and

Parameter II, a duration D within which data transmission and reception are suspended.

After sending a data packet each time, the terminal starts a timer (called as the service inactive timer, and the duration of the timer is defined as T), or restarts the timer (if the timer is already running) When the timer expires, the terminal determines that the transmission of service data may be suspended, and enters the deep sleep mode. In the deep sleep mode, the terminal does not receive or send the wireless signal. The duration of the deep sleep mode is D, that is, after the duration D, the terminal will re-enter an active mode to begin to receive and send the wireless signal.

In the embodiments of the disclosure, the terminal is configured with a timer for detecting service inactivity, namely the service inactivity timer, that is, a first timer. When the terminal is scheduled by the network device to send the data packet or perform data transmission based on pre-configured wireless resources, the terminal will start or restart the timer. When the timer expires, the terminal enters the deep sleep mode, where the duration of the deep sleep mode is D. After the terminal device enters the deep sleep mode for the duration D, the terminal device re-enters the active mode and begins to receive or send wireless signals.

The parameters I and II may be configured through RRC signaling. In such case, after the terminal correctly receives the parameters I and II, a switching mechanism between the deep sleep mode and the active mode, namely the mode switching mechanism is activated.

The parameters I and II may be configured through an MAC CE. In such case, after the terminal correctly receives the parameters I and II carried in the MAC CE, the switching mechanism between the deep sleep mode and the active mode is activated.

No matter which signaling manner is adopted to send the parameters I and II, the mode switching mechanism will not be activated until the terminal device enters a wireless resource control connected state (i.e., the RRC-connected state).

The network device may directly notify the terminal to enter the deep sleep mode, in such case, the terminal device immediately enters the deep sleep mode after receiving a notification message used for notifying the terminal to enter the deep sleep mode, that is, a mode switching indication.

Before entering the deep sleep mode, the terminal device may notify, through a mode switching notification, the network device that the terminal device is capable of entering the deep sleep mode. When the network device determines, based on assistance information such as a BSR and a service characteristic provided by the terminal device (i.e., UE), that the UE needs to enter the deep sleep mode, the network device stops sending a related reference signal, notifies the UE to enter the deep sleep mode, and notifies the UE of specific information of the deep sleep mode, such as a mode in a time domain.

The sending of the mode switching notification itself does not start the service inactivity timer. After receiving the mode switching notification, the network device performs power-saving operations according to actual needs, for example, the network device may suspend the sending of the reference signal related to the terminal.

Figure 12:
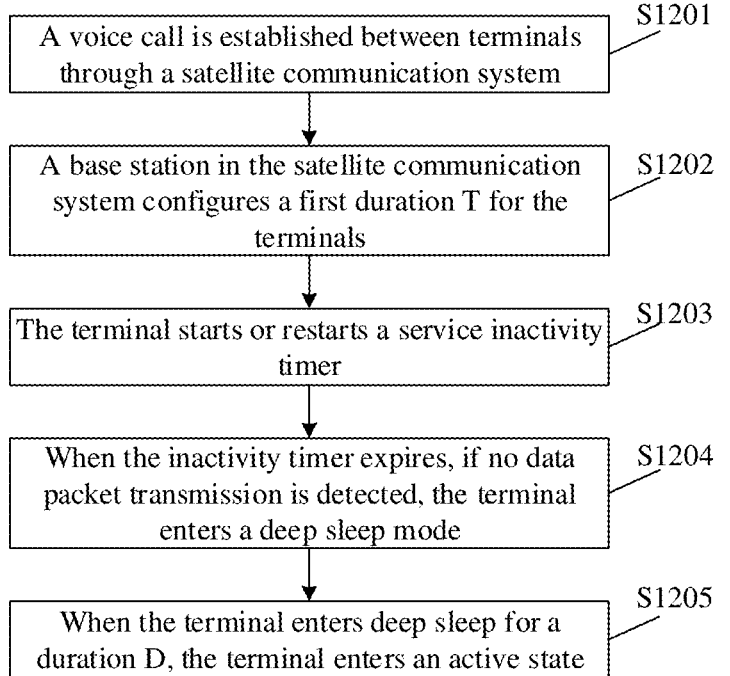
FIG. 12 is a schematic flowchart of an optional device control method according to an embodiment of the disclosure.
Figure 13:
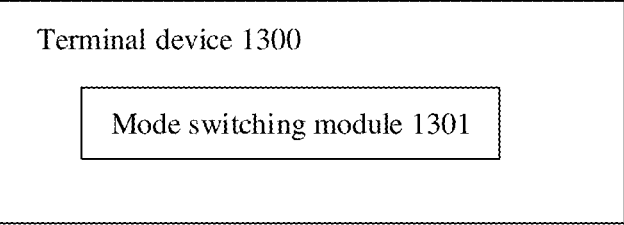
FIG. 13 is an optional schematic structural diagram of a terminal device according to an embodiment of the disclosure.

A device control method provided by the embodiments of the disclosure, as illustrated in FIG. 12, includes the following operations.

At S1201, a voice call is established between terminals through a satellite communication system.

The first terminal (i.e., terminal 1) calls the second terminal (i.e., terminal 2) through the first satellite communication system (i.e., the satellite communication system 1), and the voice call is established between the terminal 1 and the terminal 2 according to a calling procedure of the satellite communication system.

At S1202, a base station in the satellite communication system configures a first duration T for the terminals.

The base station in the satellite communication system estimates that an idle period as illustrated in FIG. 2 is basically stable at about 10 seconds, sets T to 500 milliseconds and D to 8000 milliseconds respectively, and configures the T and D for the terminals 1 and 2 through MAC CE.

At S1203, the terminal starts or restarts a service inactivity timer.

Taking the terminal 1 as an example, after receiving the MAC CE, the terminal 1 starts or restarts the service inactivity timer every time a data packet is sent, where a period T of the service inactivity timer is 500 milliseconds.

At 1204, when the inactivity timer expires, if no data packet transmission is detected, the terminal enters a deep sleep mode.

After a user using the terminal 1 finishes speaking a sentence, if sending of the data packet is not detected by the terminal 1 within 500 milliseconds, the terminal 1 determines that the user has finished his speaking, and automatically enters the deep sleep mode.

At S1205, when the terminal enters deep sleep for the duration D, the terminal enters an active state.

After deep sleep of 8000 milliseconds, the terminal 1 re-enters the active state, for example, re-measures the channel. After re-entering the active state for about 1,500 milliseconds, the terminal 1 begins to receive a voice data packet transmitted from the terminal 2. When the user speaks again, that is, the terminal 1 starts to send the data packet again, go back to operation S1203.

According to the device control method provided by the embodiments of the disclosure, the terminal flexibly enters the power-saving deep sleep mode in time according to a state of an actual service, thus the power consumption of the terminals in a satellite communication network can be greatly reduced.

In order to implement the above device control method, the embodiments of the disclosure further provide a terminal device. A composition structure of the terminal device is illustrated in FIG. 3. The terminal device includes a mode switching module 1301.

The mode switching module 1301 is configured to control the terminal device to enter a deep sleep mode in response to at least one of the following: determining that no data transmission is detected within a first duration, or receiving a mode switching indication sent by a network device.

In some embodiments, the network device in the deep sleep mode does not transmit and receive wireless signals.

In some embodiments, a configuration manner of the first duration includes at least one of the following:

The first duration is configured by the network device through RRC signaling;

The first duration is configured by the network device through an MAC CE; or

The first duration is configured by the network device through physical layer signaling.

In some embodiments, the mode switching module 1301 is further configured to:

detect data transmission within a running period of a first timer; and control the terminal device to enter the deep sleep mode when the first timer expires, where the period of the first timer is the first duration.

In some embodiments, a timing of starting or restarting the first timer includes at least one of the following:

a moment at which data transmission is completed in a case where the terminal device is scheduled by the network device to perform the data transmission; or a moment at which the terminal device completes data transmission through pre-configured wireless resources.

In some embodiments, the pre-configured wireless resources include PUSCH channel resources.

In some embodiments, the terminal device 1300 further includes a notification module.

The notification module is configured to send a mode switching notification to the network device before the mode switching indication sent by the network device is received. The mode switching notification indicates that the terminal device is capable of entering the deep sleep mode.

In some embodiments, the mode switching indication indicates a manner in which the terminal device enters the deep sleep mode in the time domain.

In some embodiments, the mode switching module 1301 is further configured to control the terminal device to be switched from the deep sleep mode to an active mode after the terminal device enters the deep sleep mode for a second duration, where the terminal device in the active mode is capable of receiving and/or sending wireless signals.

In some embodiments, the configuration manner of the second duration includes at least one of the following:

the second duration is configured by the network device through RRC signaling;

the second duration is configured by the network device through MAC CE; or the second duration is configured by the network device through physical layer signaling.

In some embodiments, a condition for the terminal device to enter deep sleep includes: the terminal device is operating with a mode switching mechanism.

In some embodiments, an activation timing of the mode switching mechanism includes: a moment at which the terminal device receives the mechanism activation indication information configured by the network device.

In some embodiments, in a case where the terminal device determines that no data transmission is detected within the first duration, the mechanism activation indication information configured by the network device includes at least one of the first duration or the second duration configured by the network device; and/or in a case where the terminal device receives the mode switching indication sent by the network device, the mechanism activation indication information configured by the network device includes the mode switching indication.

In some embodiments, an activation condition of the mode switching mechanism includes at least one of the following:

the terminal device is in a wireless resource control connected state; or the terminal device supports the mode switching mechanism.

In some embodiments, the terminal device 1300 further includes a reporting module.

The reporting module is configured to send switching capability indication information to the network device, where the switching capability indication information indicates that the terminal device supports the mode switching mechanism.

In some embodiments, a sending manner of the switching capability indication information includes:

The switching capability indication information is sent through User Equipment capability signaling (i.e., UE CAPABILITY signaling).

The embodiments of the disclosure further provide a terminal device, which includes a processor and a memory configured to store a computer program executable by the processor. The processor is configured to perform the device control method executed by the terminal device above when running the computer program.

Figure 14:
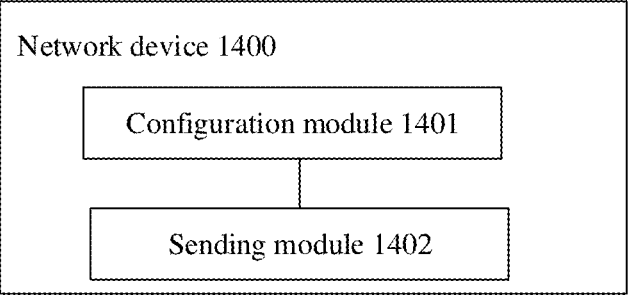
FIG. 14 is an optional schematic structural diagram of a network device according to an embodiment of the disclosure.

In order to implement the above device control method, the embodiments of the disclosure further provide a network device. A composition structure of the network device is illustrated in FIG. 14. The network device 1400 includes at least one of a configuration module 1401 or a sending module 1402.

The configuration module 1401 is arranged to configure a first duration for a terminal device, where when a duration within which no data transmission is detected by the terminal device reaches the first duration, the terminal device enters a deep sleep mode.

The sending module 1402 is configured to send a mode switching indication to the terminal device, where the mode switching indication instructs the terminal device to enter the deep sleep mode.

In some embodiments, the terminal device in the deep sleep mode does not transmit and receive wireless signals.

In some embodiments, when the first duration is configured for the terminal device, a configuration manner of the first duration includes at least one of the following:

the first duration is configured by the network device through RRC signaling;

the first duration is configured by the network device through MAC CE; or the first duration is configured by the network device through physical layer signaling.

In some embodiments, the network device 1400 further includes a first receiving module.

The first receiving module is configured to receive a mode switching notification from the terminal device before sending the mode switching indication to the terminal device, where the mode switching notification indicates that the terminal device is capable of entering the deep sleep mode.

In some embodiments, when the mode switching indication is sent to the terminal device, whether to send the mode switching indication to the terminal is determined according to at least one of a BSR or a service characteristic.

In some embodiments, the mode switching indication indicates a manner in which the terminal device enters the deep sleep mode in the time domain.

In some embodiments, the network device 1400 further includes a power-saving module.

The power-saving module is configured to perform a power-saving operation associated with the terminal device.

In some embodiments, a timing of performing the power-saving operation associated with the terminal device includes at least one of the following:

a moment at which transmission of the mode switching indication is completed;

a moment at which reception of the mode switching notification is completed; or a moment, determined based on the first duration, at which the terminal device enters the deep sleep state.

In some embodiments, the power-saving operation associated with the terminal device includes:

stopping transmitting a reference signal related to the terminal device.

In some embodiments, the configuration module 1401 is further arranged to configure a second duration for the terminal device, where the second duration is a duration within which the terminal device is in the deep sleep mode.

In some embodiments, the configuration manner of the second duration includes at least one of the following:

the second duration is configured by the network device through RRC signaling;

the second duration is configured by the network device through MAC CE; or the second duration is configured by the network device through physical layer signaling.

In some embodiments, the configuration module 1401 is further arranged to configure mechanism activation indication information for the terminal device. The mechanism activation indication information instructs the terminal device to activate a mode switching mechanism.

In some embodiments, at least one of the following applies:

in a case where the terminal device is configured with the first duration, the mechanism activation indication information includes at least one of the first duration or the second duration; or in a case where the mode switching indication is sent to the terminal device, the mechanism activation indication information includes the mode switching indication.

In some embodiments, the network device 1400 further includes a first receiving module.

The first receiving module is configured to receive switching capability indication information sent by the terminal device, where the switching capability indication information indicates that the terminal device supports the mode switching mechanism.

In some embodiments, a receiving manner of the switching capability indication information includes:

the switching capability indication information is received through user equipment capability signaling (i.e., UE CAPABILITY signaling).

The embodiments of the disclosure further provide a network device, which includes a processor and a memory configured to store a computer program executable by the processor, where the processor is configured to perform a device control method executed by the above network device when running the computer program.

Figure 15:
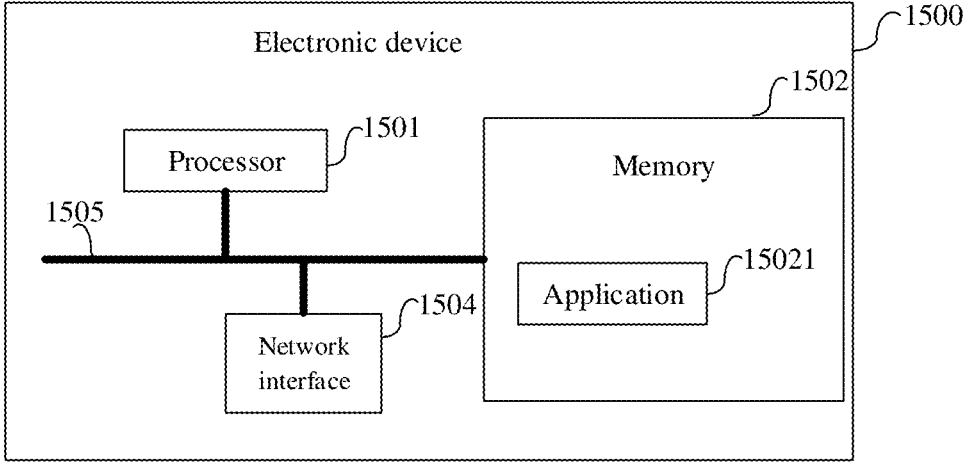
FIG. 15 is an optional schematic structural diagram of an electronic device according to an embodiment of the disclosure.

FIG. 15 is a schematic diagram of a hardware composition structure of an electronic device (a terminal device or a network device) according to an embodiment of the disclosure. The electronic device 1800 includes: at least one processor 1501, a memory 1502, and at least one network interface 1504. Various components of the electronic device 1500 are coupled together through a bus system 1505. It is to be understood that the bus system 1505 is configured to implement connection and communication between these components. In addition to a data bus, the bus system 1505 further includes a power bus, a control bus, and a status signal bus. However, for clarity of description, various buses are labeled as the bus system 1505 in FIG. 15.

It is to be understood that the memory 1502 may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), a Ferromagnetic Random Access Memory (FRAM), a Flash Memory, a magnetic surface memory, an optical disk or a Compact Disc Read-Only Memory (CD-ROM). The magnetic surface memory may be a magnetic disk memory or a magnetic tape memory. The volatile memory may be a Random Access Memory (RAM) that acts as an external cache. It is exemplarily but unlimitedly described that RAMs in various forms may be adopted, such as a Static RAM (SRAM), a Synchronous Static RAM (SSRAM), Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). The memory 1502 described in the embodiment of the disclosure is intended to include, but is not limited to, these and any other suitable types of memories.

The memory 1502 in the embodiments of the disclosure is configured to store various types of data to support an operation of the communication device 1500. Examples of such data include: any computer program operated on the communication device 1500, such as an application 15021. A program for implementing the method in the embodiment of the disclosure may be included in the application 15021.

The method disclosed in the above embodiments of the disclosure may be applied to the processor 1501, or may be implemented by the processor 1501. The processor 1501 may be an integrated circuit chip with signal processing capability. During implementation, the operations of the above method may be implemented by hardware integrated logic circuits in the processor 1501 or instructions in the form of software. The above processor 1501 may be a general-purpose processor, a Digital Signal Processor (DSP), or other programmable logic devices, discrete gate or transistor logic devices, discrete hardware components, or the like. The processor 1501 may implement or perform various methods, steps, and logical block diagrams disclosed in the embodiments of the disclosure. The general-purpose processor may be a microprocessor, or any conventional processor. Steps of the methods disclosed with reference to the embodiments of the disclosure may be directly performed and accomplished by a hardware decoding processor, or may be performed and accomplished by a combination of hardware and software modules in the decoding processor. A software module may be located in a storage medium. The storage medium is located in the memory 1502, and the processor 1501 reads information in the memory 1502 and completes the steps of the above method in combination with hardware thereof.

In an exemplary embodiment, the electronic device 1500 may be implemented by one or more Application Specific Integrated Circuits (ASICs), DSPs, Programmable Logic Devices (PLDs), Complex Programmable Logic Devices (CPLDs), Field Programmable Gate Arrays (FPGAs), general-purpose processors, controllers, Micro Controller Units (MCUs), Micro Processor Units (MPUs), or other electronic elements, for executing the above methods.

The embodiments of the disclosure further provide a storage medium for storing a computer program.

Optionally, the storage medium may be applied to a terminal device in the embodiments of the disclosure. The computer program enables a computer to execute corresponding processes in each method of the embodiments of the disclosure, which will not be elaborated here for simplicity.

Optionally, the storage medium may be applied to a network device in the embodiments of the disclosure. The computer program enables the computer to execute corresponding processes in each method of the embodiments of the disclosure, which will not be elaborated here for simplicity.

The disclosure is described with reference to flowcharts and/or block diagrams of the method, the device (system) and the computer program product according to the embodiments of the disclosure. It is to be understood that each flow and/or block in the flowcharts and/or the block diagrams and a combination of the flows and/or the blocks in the flowcharts and/or the block diagrams may be implemented by computer program instructions. These computer program instructions may be provided for a general-purpose computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may be also stored in a computer readable memory capable of guiding the computers or the other programmable data processing devices to work in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may be also loaded to the computers or the other programmable data processing devices, so that processing implemented by the computers is generated by executing a series of operation steps on the computers or the other programmable devices, and therefore the instructions executed on the computers or the other programmable devices provide a step of achieving the functions designated in one or more flows of the flowcharts and/or one or more blocks of the block diagrams.

The description above is only the preferred embodiment of the disclosure and is not intended to limit the scope of protection of the disclosure. Any modifications, equivalent replacements, improvements and the like made within the spirit and principle of the disclosure shall fall within the scope of protection of the disclosure.

The invention claimed is:

1. A device control method, comprising:

entering, by a terminal device, a deep sleep mode in response to-determining that no data transmission is detected within a first duration; and switching, by the terminal device, from the deep sleep mode to an active mode after entering the deep sleep mode for a second duration, wherein the first duration is 500 milliseconds, and the second duration is 8000 milliseconds, and a configuration manner of the first duration or the second duration comprises at least one of the following:

the first duration or the second duration is configured by a network device through Radio Resource Control (RRC) signaling;

the first duration or the second duration is configured by the network device through Media Access Control (MAC) Control Element (CE); or the first duration or the second duration is configured by the network device through physical layer signaling.

2. The method of claim 1, wherein the terminal device in the deep sleep mode does not transmit and receive wireless signals, and does not perform Radio Resource Management (RRM) measurement.

3. The method of claim 1, wherein entering, by the terminal device, the deep sleep mode in response to determining that no data transmission is detected within the first duration comprises:

detecting, by the terminal device, data transmission within a period of a first timer; and entering, by the terminal device, the deep sleep mode when the first timer expires, wherein the period of the first timer is the first duration.

4. The method of claim 3, wherein a timing of starting or restarting the first timer comprises at least one of the following:

a moment at which data transmission is completed in a case where the terminal device is scheduled by the network device to perform the data transmission; or a moment at which the terminal device completes data transmission through pre-configured wireless resources.

5. The method of claim 1, wherein the terminal device in the active mode is capable of performing at least one of transmission or reception of wireless signals.

6. The method of claim 1, wherein a condition for the terminal device to enter the deep sleep mode comprises:

the terminal device operates with a mode switching mechanism.

7. The method of claim 6, wherein an activation timing of the mode switching mechanism comprises:

a moment at which the terminal device receives mechanism activation indication information configured by the network device.

8. The method of claim 7, wherein when the terminal device determines that no data transmission is detected within the first duration, the mechanism activation indication information configured by the network device comprises at least one of the first duration or the second duration configured by the network device.

9. The method of claim 1, wherein the method is applied to a Non-Terrestrial Network (NTN) system.

10. A device control method, comprising:

configuring, by a network device, a first duration for a terminal device, wherein when a duration within which no data transmission is detected by the terminal device reaches the first duration, the terminal device enters a deep sleep mode; and configuring, by the network device, a second duration for the terminal device, wherein the second duration is a duration within which the terminal device is in the deep sleep mode, wherein the first duration is 500 milliseconds, and the second duration is 8000 milliseconds, and a configuration manner of the first duration or the second duration comprises at least one of the following:

the first duration or the second duration is configured by the network device through Radio Resource Control (RRC) signaling;

the first duration or the second duration is configured by the network device through Media Access Control (MAC) Control Element (CE); or the first duration or the second duration is configured by the network device through physical layer signaling.

11. The method of claim 10, wherein the terminal device in the deep sleep mode does not transmit and receive wireless signals, and does not perform Radio Resource Management (RRM) measurement.

12. The method of claim 10, further comprising:

performing, by the network device, a power-saving operation associated with the terminal device.

13. The method of claim 12, wherein a timing for the network device to perform the power-saving operation associated with the terminal device comprises a moment, determined based on the first duration, at which the terminal device enters the deep sleep state.

14. The method of claim 10, wherein configuring, by the network device, mechanism activation indication information for the terminal device, wherein the mechanism activation indication information instructs the terminal device to active a mode switching mechanism.

15. The method of claim 14, wherein-when the network device configures the first duration for the terminal device, the mechanism activation indication information comprises at least one of the first duration or a second duration.

16. The method of claim 10, wherein the method is applied to a Non-Terrestrial Network (NTN) system.

17. A terminal device, comprising:

a processor; and a memory configured to store a computer program executable by the processor, wherein the processor is configured to, when running the computer program, to cause the terminal device to perform:

entering a deep sleep mode in response to determining that no data transmission is detected within a first duration; and switching from the deep sleep mode to an active mode after entering the deep sleep mode for a second duration, wherein the first duration is 500 milliseconds, and the second duration is 8000 milliseconds, and a configuration manner of the first duration or the second duration comprises at least one of the following:

the first duration or the second duration is configured by a network device through Radio Resource Control (RRC) signaling;

the first duration or the second duration is configured by the network device through Media Access Control (MAC) Control Element (CE); or the first duration or the second duration is configured by the network device through physical layer signaling.

18. The terminal device of claim 17, wherein the terminal device in the deep sleep mode does not transmit and receive wireless signals, and does not perform Radio Resource Management (RRM) measurement.

19. A network device, comprising:

a processor; and a memory configured to store a computer program executable by the processor, wherein the processor is configured to, when running the computer program, to cause the network device to perform:

configuring a first duration for a terminal device, wherein when a duration within which no data transmission is detected by the terminal device reaches the first duration, the terminal device enters a deep sleep mode; and configuring, by the network device, a second duration for the terminal device, wherein the second duration is a duration within which the terminal device is in the deep sleep mode, wherein the first duration is 500 milliseconds, and the second duration is 8000 milliseconds, and a configuration manner of the first duration or the second duration comprises at least one of the following:

the first duration or the second duration is configured by a network device through Radio Resource Control (RRC) signaling;

the first duration or the second duration is configured by the network device through Media Access Control (MAC) Control Element (CE); or the first duration or the second duration is configured by the network device through physical layer signaling.

20. The network device of claim 19, wherein the terminal device in the deep sleep mode does not transmit and receive wireless signals, and does not perform Radio Resource Management (RRM) measurement.

\* \* \* \* \*